United States Patent
Kajita

(10) Patent No.: US 7,434,607 B2
(45) Date of Patent: Oct. 14, 2008

(54) PNEUMATIC TIRE WITH SPECIFIED BEAD APEX AND SIDEWALL REINFORCING RUBBER LAYER

(75) Inventor: Hiroaki Kajita, Kobe (JP)

(73) Assignee: Sumitomo Rubber Industries, Ltd., Hyogo-Ken (JP)

( * ) Notice: Subject to any disclaimer, the term of this patent is extended or adjusted under 35 U.S.C. 154(b) by 465 days.

(21) Appl. No.: 11/293,258

(22) Filed: Dec. 5, 2005

(65) Prior Publication Data

US 2006/0180259 A1    Aug. 17, 2006

(30) Foreign Application Priority Data

Feb. 14, 2005    (JP)    ............... 2005-036431

(51) Int. Cl.
*B60C 1/00*    (2006.01)
*B60C 9/02*    (2006.01)
*B60C 13/00*    (2006.01)
*B60C 15/06*    (2006.01)
*B60C 5/14*    (2006.01)

(52) U.S. Cl. ............ 152/510; 152/525; 152/546; 152/555

(58) Field of Classification Search ............ 152/458, 152/510, 517, 525, 546, 549, 555
See application file for complete search history.

(56) References Cited

U.S. PATENT DOCUMENTS 4,067,372 A    1/1978    Masson
5,639,321 A *  6/1997   Sakamoto et al. ....... 152/546 X

FOREIGN PATENT DOCUMENTS

| EP | 0 301 093 A1 | 2/1989 |
| EP | 0 638 445 A1 | 2/1995 |
| EP | 0 744 305 A2 | 11/1996 |
| EP | 0 744 305 A3 | 11/1996 |
| JP | 1-83411 A | 3/1989 |
| JP | 08318713 A * | 12/1996 |
| JP | 2003-175708 A | 6/2003 |

* cited by examiner

Primary Examiner—Adrienne C Johnstone
(74) Attorney, Agent, or Firm—Birch, Stewart, Kolasch & Birch, LLP

(57) ABSTRACT

A pneumatic tire comprises: a tread portion; a pair of sidewall portions; a pair of bead portions each with a bead core therein; a carcass having a main portion extending between the bead portions; a belt disposed radially outside the carcass in the tread portion; a bead apex disposed in each of the bead portions and extending radially outwardly from the bead core, wherein the radial height h1 of the radially outer edge of the bead apex rubber is not more than 28% of the tire section height H; and a sidewall reinforcing rubber layer disposed in each of the sidewall portions and extending along the carcass main portion at least between a radial position corresponding to the radial position of the radially outer edge of the bead apex rubber and an axial position corresponding to the axial position of the axially outer edge of the belt, wherein the sidewall reinforcing rubber layer has a thickness in a range of from 0.5 to 1.5 mm and a complex elastic modulus E* in a range of from 13 to 16 MPa.

8 Claims, 3 Drawing Sheets

PNEUMATIC TIRE WITH SPECIFIED BEAD APEX AND SIDEWALL REINFORCING RUBBER LAYER

The present invention relates to a pneumatic tire, more particularly to a sidewall structure capable of improving steering stability and resistance to flatspot.

In recent years, multi-purpose vehicles (MPV), sports utility vehicles (SUV), estate cars and the like are widely used. Such kinds of vehicles are, in comparison with passenger cars, usually heavy in vehicle weight, and relatively large sized tires having a relatively high aspect ratio (for example 65% or more) are used so as to run on rough roads as well as well-paved roads.

On the other hand, in order to improve steering stability, conventionally employed techniques are for example, increasing the volume and/or hardness of a bead apex rubber, increasing the height of a carcass turnup portion, and/or disposing a reinforcing cord layer in the bead portion.

Such techniques effectively increase the rigidity in the lower sidewall region near the bead portion, but in the upper sidewall region from the tread edge to near the maximum tire section width point, the rigidity is not so increased.

This may be considered as being not a disadvantage for the passenger car tires. But, in the above-mentioned relatively large-sized high-aspect ratio tires used with the above-mentioned relatively heavy vehicles, as the size of the upper sidewall region is relatively large in the tire radial direction, the rigidity thereof strongly affects the steering stability, and a shortage of the rigidity greatly deteriorates the steering stability. Further, if a vehicle is parked for a long period of time, the tire is liable to flatspot.

In order to increase the rigidity in the upper sidewall region, if an additional reinforcing cord layer is disposed in this region, then the tire durability is liable to deteriorate because this region is such a region in which deformation or deflection concentrates and as a result the cord reinforcing layer tends to cause cord loose, separation failure and the like.

Thus, the present inventor made studies and found that if the bead apex rubber is downsized against the conventional techniques and a specific rubber layer is disposed in a specific region, then the rigidity of the sidewall portion becomes evened and increased in a well-balanced manner to improve steering stability and resistance to flatspot.

It is therefore, an object of the present invention to provide a pneumatic tire, in which steering stability and flat spots can be improved without deteriorating the durability.

According to the present invention, a pneumatic tire comprises:

a tread portion;

a pair of sidewall portions;

a pair of bead portions each with a bead core therein;

a carcass having a main portion extending between the bead portions;

a belt disposed radially outside the carcass in the tread portion;

a bead apex disposed in each said bead portion and extending radially outwardly from the bead core, wherein the radial height h1 of the radially outer edge of the bead apex rubber is not more than 28% of the tire section height H, each from the bead base line; and a sidewall reinforcing rubber layer disposed in each said sidewall portion and extending along the carcass main portion at least between a radial position corresponding to the radial position of the radially outer edge of the bead apex rubber and an axial position corresponding to the axial position of the axially outer edge of the belt, wherein the sidewall reinforcing rubber layer has a thickness in a range of from 0.5 to 1.5 mm, and a complex elastic modulus E* in a range of from 13 to 16 MPa.

Embodiments of the present invention will now be described in detail in conjunction with the accompanying drawings.

Figure 1:
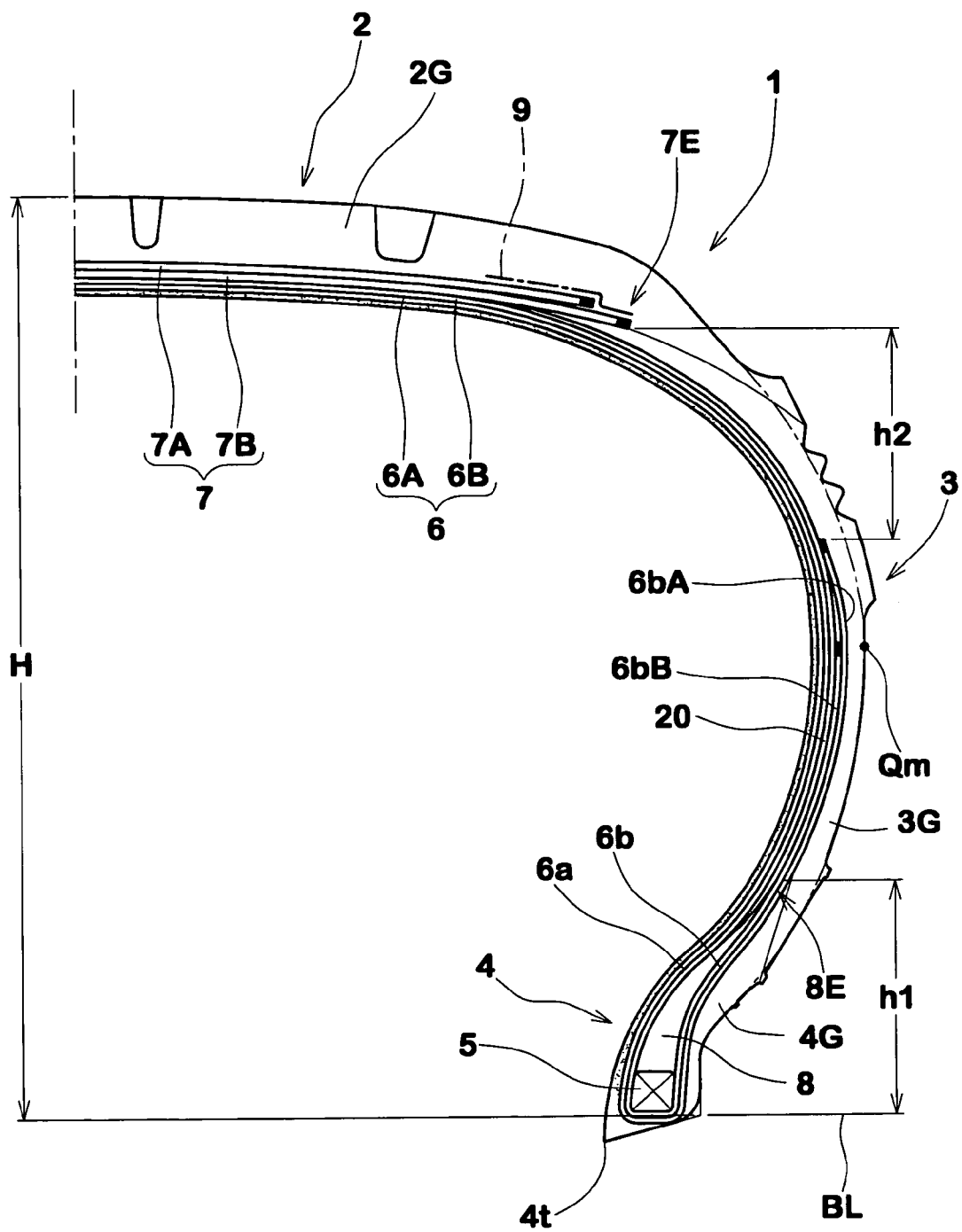
FIG. 1 is a cross sectional view of a pneumatic tire according to the present invention.

In the drawings, pneumatic tire 1 according to the present invention comprises: a tread portion 2; a pair of bead portions 4 each with a bead core 5 therein; a pair of sidewall portions 3 extending therebetween; a carcass 6 extending between the bead portions 4 through the tread portion 2 and sidewall portions 3; a belt 7 disposed radially outside the carcass 6 in the tread portion 2; rubber components defining the outer surface of the tire including a tread rubber 2G, sidewall rubber 3G and bead rubber 4G; and a bead apex rubber 8 extending radially outwardly from the radially outside of the bead core 5.

In the following embodiments, the tire is a mud and snow (M&S) radial tire of size 265/65R17 for sports utility vehicles having a block-based tread pattern (not shown).

Unless otherwise noted, various dimensions of the tire are measured in a standard state in which the tire is mounted on a standard wheel rim and inflated to 50 kPa. Here, the standard wheel rim is a wheel rim officially approved for the tire by standard organization, i.e. JATMA (Japan and Asia), T&RA (North America), ETRTO (Europe), STRO (Scandinavia) and the like.—For example, the "standard rim" specified in JATMA, the "Measuring Rim" in ETRTO, the "Design Rim" in T&RA or the like.

The undermentioned complex elastic modulus E* is measured with a viscoelastic spectrometer under the following conditions: temperature of 70 deg. C.; frequency of 10 Hz; initial strain of 10%; and dynamic distortion of plus/minus 1%.

The belt 7 is composed of at least two cross plies 7A and 7B of high strength cords, e.g. steel cords and the like. In each ply, the cords are laid at an angle of 10 to 35 degrees with respect to the tire equator, inclining one direction crosswise to the cords of the next ply. Thus, the rigidity of the belt 7 is increased, and the belt can provide its hoop effect to reinforce the substantially overall width of the tread portion 2.

Optionally, a band 9 made of organic fiber cords can be disposed radially outside the belt 7 to improve high-speed durability. The cord angle of the band is not more than 5 degrees with respect to the tire equator. As the band 9, a full-width band covering the substantially overall width the belt 7, or a pair of axially spaced edge bands covering the axial edges of the belt 7 only, or a combination of a full-width band and edge bands may be used. In this example, a pair of edge bands are disposed to lessen the occurrence of flat spots.

The carcass 6 is made up of a toroidal main portion 6a extending between the bead cores 5 in the bead portions and a pair of turnup portions 6b each turned up around the bead core 5 in each of the bead portions from the axially inside to the axially outside of the tire.

Between the carcass main portion 6a and turnup portion 6b in each bead portion, a bead apex 8 is disposed to reinforce the bead portions.

The bead apex 8 is made of a high elastic modulus rubber having a complex elastic modulus E*1 in a range of from 35 to 60 Mpa. The radially outer end 8E of the bead apex rubber 8 is positioned at a radial height h1 of not more than 28% of the tire section height H, each measured from the bead base line BL. The bead base line BL is as well known in the art a straight line passing the bottom of the bead portion in parallel with the tire axis. More specifically, the bead base line extends at a position corresponding to the wheel rim diameter. If the radial height h1 is more than 28%, it is difficult to even the sidewall rigidity, and uneven deformation of the upper sidewall region is liable to increase. Therefore, it is difficult to achieve the object of the invention. Especially, it is difficult to reduce flat spots. In view of the durability of the bead portion, it is preferable that the radial height h1 of the bead apex rubber 8 is set in a range of not less than 20% of the tire section height H.

The above-mentioned carcass 6 is composed of at least one ply, in this example two plies 6A and 6B of organic fiber cords, e.g. nylon, polyester, rayon, aromatic polyamide and the like arranged radially at an angle of from 75 to 90 degrees with respect to the tire equator.

Each of the turnup portions 6bA, 6bB of each carcass ply 6A, 6B extends radially outwardly beyond the radially outer end 8E of the bead apex rubber 8 and terminates on the axially outside of the axially outer edge 7E of the belt 7. In this example, the axially outer turnup portion 6bA extends radially outwardly beyond the radially outer edge of the axially inner turnup portion 6bB and further beyond the maximum tire section width point Qm corresponding to the maximum cross-section width point of the carcass. Thus, the axially outer turnup portion 6bA completely covers the axially outer surface of the axially inner turnup portion 6bB.

Preferably, the radial distance h2 between the radially outer edge of the axially outer turnup portion 6bA and the outer edge 7E of the belt 7 is set in a range of not less than 17% of the tire section height H. If less than 17%, the occurrence of flat spots may be increased.

The radial distance between the radially outer edges of the outer and inner turnup portions 6bA and 6bB is preferably set in a range of not less than 10 mm in order to avoid the occurrence of large rigidity difference in such area.

Aside from the above two-ply carcass, it is also possible that the carcass 6 consists of a single ply 6A (namely, the above-described outer carcass ply having the turnup portions 6bA only).

In the tread portion 2, the tread rubber 2G is disposed on the radially outside of the belt 7 (and band 9 if any) to define the tread surface.

In each of the sidewall portions 3, the sidewall rubber 3G having a complex elastic modulus E*3 in a range of from 2.5 to 6 Mpa is disposed on the axially outside of the carcass 6 to define the outer surface of the tire. The sidewall rubber 3G tapers towards its radially outer end, and the radially outer tapered end portion is extended into the tread portion along the radially inside of the belt 7(7B).

In each of the bead portions 4, the bead rubber 4G harder than the sidewall rubber is disposed along the axially outer surface and bottom surface of the bead portion, and its radially outer tapered end portion is extended radially outwardly up to a height near but slightly higher than the bead apex outer end 8E along the carcass turnup portions 6b and overlap-jointed to the radially inner tapered end portion of the sidewall rubber 3G. On the other hand, the radially inner end portion is extended to the bead toe 4t and then turned up to a small radial height approximately corresponding to the radially outer end of the bead core 5.

Further, an innerliner 11 made of a gas-impermeable rubber covering the almost entire inner surface of the tire is provided, and near the bead toe 4t the innerliner 11 merges into the bead rubber.

Each of the sidewall portions 3 is provided with a thin reinforcing rubber layer 20 along the axially inner surface or alternatively the axially outer surface of the carcass main portion 6a. The sidewall reinforcing rubber layer 20 has a thickness (t) in a range of from 0.5 to 1.5 mm, and a complex elastic modulus E*2 of 13 to 16 MPa. This modulus E*2 is higher than the complex elastic modulus E*3 of the sidewall rubber 3G, but lower than the complex elastic modulus E*1 of the bead apex rubber.

The sidewall reinforcing rubber layer 20 extends at least between a radial position corresponding to that of the radially outer edge 8E of the bead apex rubber 8 and an axial position corresponding to that of the axially outer edge 7E of the belt 7.

In this example, the sidewall reinforcing rubber layer 20 is disposed between the carcass main portion 6a and turnup portion 6b to extend along the axially outer surface of the carcass main portion 6a. The radially inner edge portions of the sidewall reinforcing rubber layer 20 is overlap-jointed to the radially outer edge portion of the bead apex rubber 8 to form an overlap 21(La).

In the tread portion, the sidewall reinforcing rubber layer 20 extends beneath the belt edges and accordingly an overlap 22(Lb) is formed between the sidewall reinforcing rubber layer 20 and the belt 7.

Therefore, in cooperation with the downsized bead apex rubber 8, it becomes possible to increase the rigidity of the sidewall portion 3 evenly throughout its overall range. Thus, the substantially whole of the sidewall portion 3 can deform or deflect uniformly during running. In other words, the stress on the carcass cords does not concentrate locally and the load is shared evenly by the entire cords and the ability of the cords can be maximized. Furthermore, as the partial deformation is minimized, advantageously, the linearity of tire deformation can be improved. Due to such multiplier effect, the steering stability can be effectively increased although the increase in the rigidity due to the reinforcing rubber layer 20 is very small. Further, as the partial deformation is lessened, the occurrence of flat spots can be controlled.

If the thickness (t) is less than 0.5 mm and/or the complex elastic modulus E*2 is less than 13 MPa, then the reinforcing effect becomes insufficient, and it becomes difficult to improve the steering stability. If the thickness (t) is more than 1.5 mm and/or the complex elastic modulus E*2 is more than 16 MPa, then the residual internal strain of the sidewall reinforcing rubber layer 20 increases, and it becomes difficult to reduce the flat spots.

If the sidewall reinforcing rubber layer 20 terminates at a position radially outside the radially outer edge 8E of the bead apex rubber 8 and/or terminates at a position axially outside the outer edge 7E of the belt 7, the gap formed therebetween becomes a rigidity weak point. As a result, the deformation becomes uneven, and the stress in the carcass cords is locally increased. Therefore, the above-mentioned overlap portions 21 and 22 have to be positive values to even the deformation.

More specifically, as the overlap portions 21 and 22 are tapered toward their extreme ends at which the thickness becomes zero, the amount of effective overlap La, Lb which is defined by a part having the above-mentioned thickness (t), in other words, a part having at least a value of the lower limit or 0.5 mm, is limited to a positive value. However, if such effective overlap La, Lb is increased, the entire overlap 21, 22 is unfavorably increased in the volume and weight, and further the resistance to flatspot tends to decrease. Therefore, the effective overlap La between the layer 20 and bead apex 8 is preferably set in a range of not less than 0, but not more than 15 mm, more preferably not more than 10 mm when measured in parallel to the tire radial direction or parallel to the tire equatorial plane. Also, the effective overlap Lb between the layer 20 and belt 7 is preferably set in a range of not less than 0, but not more than 25 mm, more preferably not more than 15 mm, still more preferably not more than 10 mm when measured in parallel to the tire axial direction.

In this example, to further even the deformation, the sidewall thickness T between the tire inner surface and the profile line N of the sidewall portion is decreased in its variation as follows. Here, the profile line N is a smooth curved line defined by eliminating small protrusions and depressions, e.g. patterns, letters, ribs, grooves and the like which are partly formed and thus practically do not affect the rigidity and deformation.

In a range between a point Q1 on the sidewall profile line N radially outwardly spaced apart from the bead base line BL by a radial distance of 75% of the tire section height H and a point Q2 on the sidewall profile line N which meets the flange Rf of the wheel rim R, the thickness T has such a distribution that a minimum Tmin lies at the maximum tire section width point Qm, and a maximum Tmax which lies somewhere in this range is not more than 150% preferably not more than 140% of the minimum Tmin.

Figure 2:
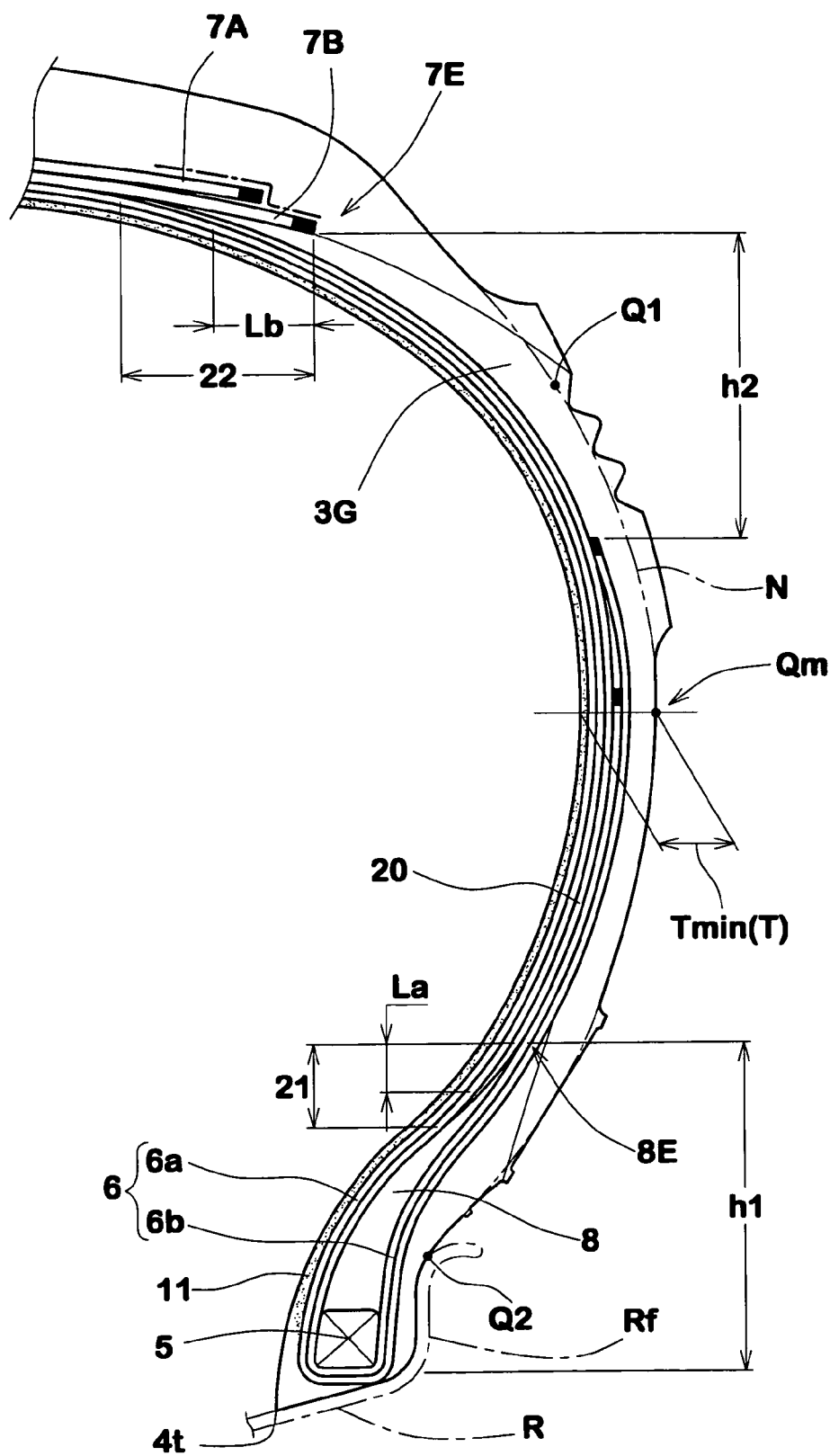
FIG. 2 is an enlarged cross sectional view of the sidewall portion thereof.
Figure 3:
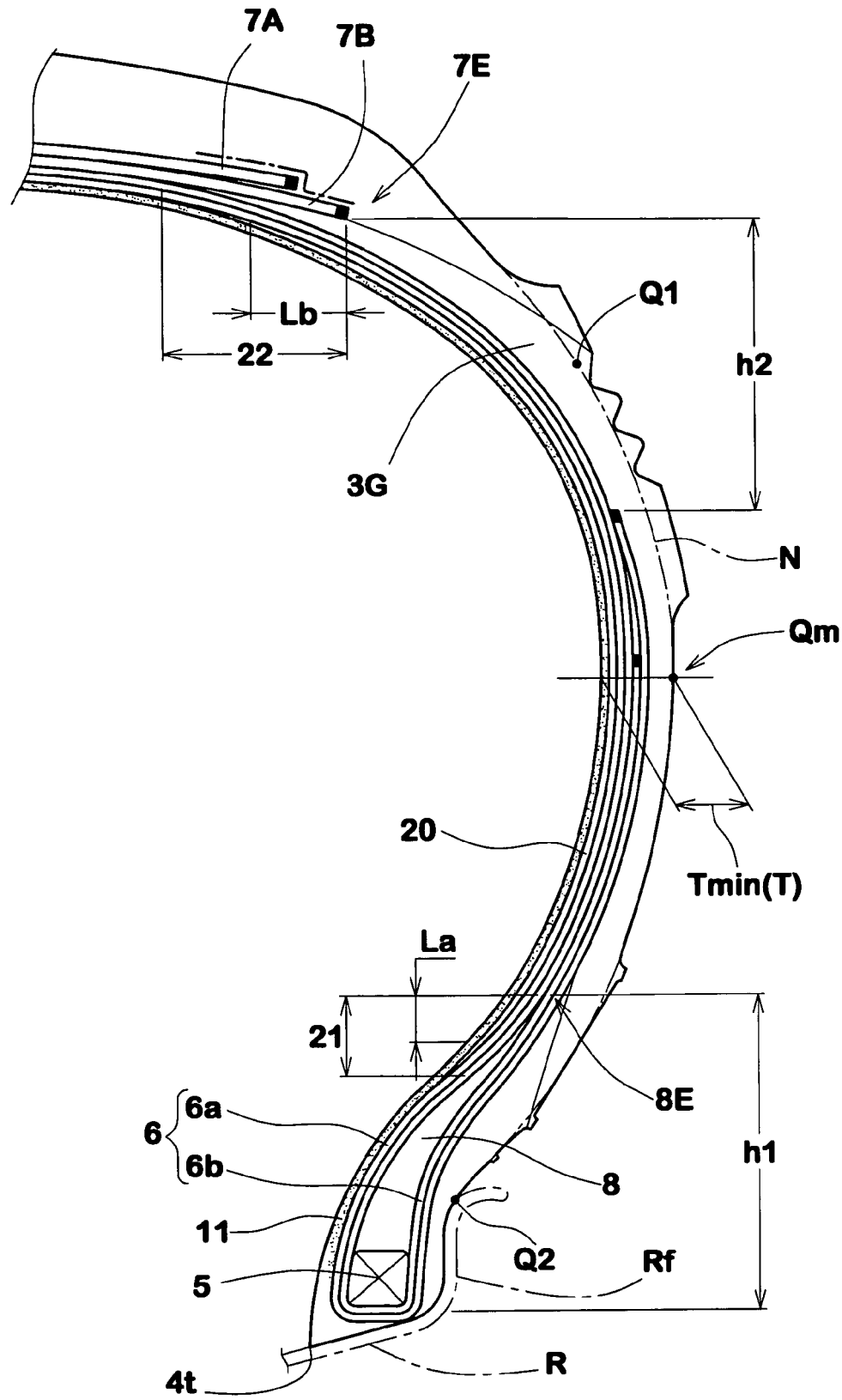
FIG. 3 is an enlarged cross sectional view of a sidewall portion showing another embodiment of the present invention.

FIG. 3 shows a modification of the above example shown in FIG. 2, in which the sidewall reinforcing rubber layer 20 is disposed along the axially inner surface of the carcass main portion 6a, and the above-mentioned innerliner 11 is disposed on the inside of the the sidewall reinforcing rubber layer 20 to cover the inner surface of the tire, but otherwise are the same as FIG. 2.

In this case, in comparison with the former embodiment, as the sidewall reinforcing rubber layer 20 is distant from the stress neutral line, the sidewall reinforcing rubber layer 20 is subjected to a larger compressive stress. As a result, the bending deformation of the sidewall is more controlled, and the steering stability and flat spots can be further improved.

In any case, if a reinforcing cord layer is disposed in stead of the sidewall reinforcing rubber layer 20, then the residual internal strain increases, and it becomes difficult to reduce the flat spots.

Aside from tires for SUV, the present invention is suitably applied to relatively large-sized pneumatic tires whose section width is in a range of 225 to 285 mm (more suitably 255 to 285 mm) and tire aspect ratio is in a range of from 70 to 50% to be mounted on wheel rims whose rim diameter is 16 to 20 inches.

Comparison Tests

Radial tires of size 265/65RR17 (rim size 17×7.5 jj) for SUV were made and tested for steering stability and resistance to flatspot. All the test tires had the substantially same structures except for the specifications shown in Table 1.

Steering Stability Test:

Using a Japanese 3400cc 4WD SUV (vehicle weight 2000 kg) provided on the four wheels with test tires (tire pressure 200 kPa), a test driver evaluated steering stability based on the steering responsiveness, rigidity, road grip and the like during running in a tire test course. The results are indicated in Table 1 based on Ref. 1 being 100. The larger the value, the better the steering stability.

Resistance to Flatspot Test:

Using a tire test drum, the test tire was run for one hour at a speed of 96.6 km/Hr, with applying a tire load of 5.88 kN and a tire pressure of 200 kPa. Then, the tire rotation was stopped and immediately the tire pressure was adjusted to 300 kPa and the tire load was increased to 7.84 kN. In such stationary state, the tire was kept for 16 hours to cause a flat spot. After that, the radial force variation (RFV) of the tire was measured according to the JASO standard C607. Further, after the RFV was measured, the tire was run for six minutes in the same conditions as above to restore the flat spot, and again RFV was measured. The larger the RFV, the larger the flat spot. The RFV values measured before and after are shown in Table 1.

Form the test results, it was confirmed that steering stability and flat spot can be improved.

TABLE 1

| Tire | Ref. 1 | Ref. 2 | Ref. 3 | Ex. 2 | Ref. 4 | Ref. 5 | Ex. 5 | Ref. 6 |
|---|---|---|---|---|---|---|---|---|
| h2/H (%) | 17 | 17 | 17 | 17 | 17 | 17 | 17 | 17 |
| Bead apex rubber | | | | | | | | |
| E*1 (MPa) | 50 | 50 | 50 | 50 | 50 | 50 | 50 | 50 |
| h1/H (%) | 35 | 28 | 28 | 28 | 28 | 20 | 20 | 20 |
| Sidewall reinforcing rubber layer | none | none | | | | | | |
| Position | — | — | FIG. 2 | FIG. 2 | FIG. 2 | FIG. 3 | FIG. 3 | FIG. 3 |
| Thickness (mm) | — | — | 0.5 | 0.5 | 0.5 | 1.5 | 1.5 | 1.5 |
| E*2 (MPa) | — | — | 12 | 15 | 17 | 12 | 15 | 17 |
| La (mm) | — | — | 10 | 10 | 10 | 10 | 10 | 10 |
| Lb (mm) | — | — | 10 | 10 | 10 | 10 | 10 | 10 |
| Tire thickness | | | | | | | | |
| Tmin (mm) | 9.5 | 9.5 | 9.5 | 9.5 | 9.5 | 10.5 | 10.5 | 10.5 |
| Tmax (mm) | 17 | 14 | 14 | 14 | 14 | 14 | 14 | 14 |

TABLE 1-continued

| Tire | Ref. 1 | Ref. 2 | Ref. 3 | Ex. 2 | Ref. 4 | Ref. 5 | Ex. 5 | Ref. 6 |
|---|---|---|---|---|---|---|---|---|
| Test results | | | | | | | | |
| Steering stability | 100 | 90 | 100 | 105 | 105 | 100 | 110 | 110 |
| Flatspot (RFV (N)) before restored | 88 | 55 | 55 | 55 | 75 | 40 | 40 | 60 |
| Difference from Ref. 1 | 0 | −33 | −33 | −33 | −13 | −48 | −48 | −28 |
| after restored | 54 | 30 | 30 | 30 | 50 | 20 | 20 | 40 |

The invention claimed is:

1. A pneumatic tire comprising:

a tread portion;

a pair of sidewall portions;

a pair of bead portions each with a bead core therein;

a carcass having a main portion extending between the bead portions;

a belt disposed radially outside the carcass in the tread portion;

a bead apex disposed in each said bead portion and extending radially outwardly from the bead core, wherein the radial height h1 of the radially outer edge of the bead apex rubber is not more than 28% of the tire section height H, each from the bead base line; and a sidewall reinforcing rubber layer disposed in each said sidewall portion and extending along the carcass main portion at least between a radial position corresponding to the radial position of the radially outer edge of the bead apex rubber and an axial position corresponding to the axial position of the axially outer edge of the belt, wherein the sidewall reinforcing rubber layer has a thickness in a range of from 0.5 to 1.5 mm, and a complex elastic modulus E* in a range of from 13 to 16 MPa.

2. The pneumatic tire according to claim 1, wherein the sidewall reinforcing rubber layer is disposed along the axially outside of the carcass main portion.

3. The pneumatic tire according to claim 1, wherein the sidewall reinforcing rubber layer is disposed along the axially inside of the carcass main portion.

4. The pneumatic tire according to claim 1, wherein the sidewall reinforcing the rubber layer overlaps with the bead apex and the belt.

5. The pneumatic tire according to claim 4, wherein an overlap of the sidewall reinforcing rubber layer with the bead apex is not more than 15 mm when measured in the radial direction.

6. The pneumatic tire according to claim 4, wherein an overlap of the sidewall reinforcing rubber layer with the belt is not more than 25 mm when measured in the tire axial direction.

7. The pneumatic tire according to claim 4, wherein the sidewall reinforcing rubber layer is disposed along the axially outside of the carcass main portion.

8. The pneumatic tire according to claim 4, wherein the sidewall reinforcing rubber layer is disposed along the axially inside of the carcass main portion.

* * * * *